(12) United States Patent
Siddalingesh (10) Patent No.: US 9,009,683 B2
(45) Date of Patent: Apr. 14, 2015

(54) SYSTEMS AND/OR METHODS FOR TESTING CLIENT REACTIONS TO SIMULATED DISRUPTIONS

(75) Inventor: Siddalingesh, Bangalore (IN)

(73) Assignee: Software AG, Darmstadt (DE)

( * ) Notice: Subject to any disclaimer, the term of this patent is extended or adjusted under 35 U.S.C. 154(b) by 391 days.

(21) Appl. No.: 13/432,462

(22) Filed: Mar. 28, 2012

(65) Prior Publication Data

US 2013/0262931 A1   Oct. 3, 2013

(51) Int. Cl.
*G06F 11/00*   (2006.01)
*G06F 9/44*    (2006.01)
*G06F 11/36*   (2006.01)

(52) U.S. Cl.
CPC .................................. *G06F 11/3672* (2013.01)

(58) Field of Classification Search
CPC .......................... G06F 11/3672; G06F 11/0709
USPC .......................................................... 717/135
See application file for complete search history.

(56) References Cited

U.S. PATENT DOCUMENTS

| | | | |
|---|---|---|---|
| 5,812,768 A | 9/1998 | Page et al. | |
| 6,704,883 B1 | 3/2004 | Zhang et al. | |
| 7,165,189 B1* | 1/2007 | Lakkapragada et al. | 714/31 |
| 7,523,198 B2 | 4/2009 | Wu et al. | |
| 8,010,325 B2 | 8/2011 | De Barros et al. | |
| 8,020,037 B1 | 9/2011 | Schwartz et al. | |
| 8,136,122 B2 | 3/2012 | Holar et al. | |
| 2008/0232264 A1* | 9/2008 | Horovitz et al. | 370/252 |
| 2009/0307530 A1* | 12/2009 | Tarta | 714/38 |
| 2010/0251262 A1 | 9/2010 | Rokicki et al. | |
| 2010/0325252 A1 | 12/2010 | Stühlmeyer | |
| 2010/0333111 A1 | 12/2010 | Kothamasu et al. | |
| 2012/0066357 A1* | 3/2012 | McFate et al. | 709/221 |

OTHER PUBLICATIONS

Esposito, C., "Assessing Quality-of-Service of Publish/Subscribe Services by means of Fault Injection Techniques" (Feb. 8, 2011, Training Day Presentation at Critical Step [retrieved from http://www.critical-step.eu/index.php/gestione-documenti/doc_download/70-fault-inhection-for-publishsubscribe-services].*

(Continued)

*Primary Examiner* — Brian W Wathen
(74) *Attorney, Agent, or Firm* — Nixon & Vanderhye PC (57) ABSTRACT

Certain example embodiments described herein relate to approaches for testing client reactions to simulated disruptions in a real production environment that leverages the publish/subscribe messaging model (or one of its variants), optionally in connection with JMS messages and/or triggers. In certain example embodiments, a test driver reads a script that includes an instruction flow that brings down brokers in a broker cluster similar to (or in a manner as inflicted by) broker crashes (e.g., where a process or application does not have a chance to save its state or data before it is terminated), and/or broker stop/start events, e.g., to simulate the problems and determine whether the client application remains intact in the presence of errors. The simulations may leverage hardware and/or software means for intentionally causing disruptions in a live production environment. Thus, it advantageously becomes possible to test an application integration's client-side failover and/or load-balancing implementations.

20 Claims, 7 Drawing Sheets

(56) References Cited

OTHER PUBLICATIONS

Cong, J.; Wang, Z.; Jia, Y., "WINPLEM: A Windows-Based Packet-Level Network Emulator," (Aug. 20-22, 2010), 2010 International Conference on Internet Technology and Applications, pp. 1-6 [retrieved from http://ieeexplore.ieee.org/stamp/stamp.jsp?tp=&arnumber=5566409].*

Esposito, C.; Cotroneo, D.; Gokhale, A., "Reliable Publish/Subscribe Middleware for Time-sensitive Internet-scale Applications" (2009) Proceedings of the Third ACM International Conference on Distributed Event-Based Systems (DEBS '09) [retrieved from http://dl.acm.org/citation.cfm?id=1619280].*

Kalita, H.K.; Nambiar, M.K., "Designing WANem : A Wide Area Network emulator tool," (Jan. 4-8, 2011), 2011 Third International Conference on Communication Systems and Networks (COMSNETS), pp. 1-4 [retrieved from http://ieeexplore.ieee.org/xpls/abs_all.jsp?arnumber=5716495&tag=1].*

Wikipedia, "Software Testing" (Mar. 27, 2011), pp. 1-19 [retrieved from http://en.wikipedia.org/w/index.php?title=Software_testing&oldid=420955914].*

Wikipedia, "Software Deployment" (Mar. 22, 2012), pp. 1-5 [retrieved from http://en.wikipedia.org/w/index.php?title=Software_testing&oldid=420955914].*

Cambridge Idioms Dictionary, $2^{nd}$ Edition (2006), pp. 1-2 [retrieved from http://idioms.thefreedictionary.com/go+live].*

Shunra VE Desktop Professional 4.0 Redefines Proactive Application Testing on Emulated Networks, Mar. 2008, Online [retrieved Mar. 28, 2012]. http://www.shunra.com/press-releases/2008/shunra-ve-desktop-professional-40-redefines-proactive-application-testing-emulat.

* cited by examiner

SYSTEMS AND/OR METHODS FOR TESTING CLIENT REACTIONS TO SIMULATED DISRUPTIONS

FIELD OF THE INVENTION

Certain example embodiments described herein relate to systems and/or methods for testing client reactions to simulated disruptions. More particularly, certain example embodiments described herein relate to approaches for testing client reactions to simulated disruptions in a real production environment that leverages the publish/subscribe messaging model (or one of its variants), optionally in connection with JMS messages and/or triggers. The techniques described herein may be used in connection with distributed, cloud computing, and/or other environments, e.g., to test client-side failover and/or load-balancing implementations.

BACKGROUND AND SUMMARY OF EXAMPLE EMBODIMENTS OF THE INVENTION

Computer messaging services are known and can be built around various different design paradigms, e.g., in connection with various standards. One messaging paradigm is the publish/subscribe (or "pub/sub") model, which sometimes is used in connection with a message broker. See, for example, U.S. Publication No. 2010/0333111. One such standard is the Java Message Service (JMS). Some JMS providers are developing client-side failover and load balancing functionality with their own proprietary implementation mechanisms, e.g., in efforts to providing high availability (HA) and scalability.

Unfortunately, exhaustively testing such mechanisms typically requires a deep understanding of the particular implementation, as well as programming skills. Part of the problem is believed to relate to the general lack of existing tools that simulate broker crashes or broker stop/start events, e.g., in connection with publish/subscribe messaging models that use a broker as a messaging infrastructure for routing messages across client applications. It therefore oftentimes is difficult to ensure that publish/subscribe models remain intact in the presence of forced and/or unforced errors such as, for example, broker crashes, broker stop/start events, network failures etc.

Some testing approaches/techniques for publish/subscriber models (and/or its variants) or for a distributed network generally involve monitoring, debugging, scalability analysis, and/or performance characteristic tracking (e.g., for latency, through-put, etc.)—and related report generation. For example:

U.S. Pat. No. 7,523,198, for example, involves an integrated testing approach for monitoring and analyzing the application and network layers' performance characteristics (including latency), which may help in improving the performance of publish/subscribe network system.

U.S. Pat. No. 8,020,037 tries to test failover and failback mechanisms in connection with a data storage approach keeps a duplicate set of data to be replaced with primary data.

U.S. Pat. No. 6,704,883 discusses testing approaches for distributed systems using a test controller that publishes the test execution scripts to subscribing test agents and collects the report for consolidation from the distributed test agents.

U.S. Pat. No. 8,010,325 involves performing a simulation to assess availability of a service in the event of various types of failures. A specification describes a behavior to be induced, and a formula under which availability is to be measured. An agent on a machine looks up a routine in a simulation library to induce the behavior on that machine, and data is gathered and reported.

Unfortunately, even these approaches do not cover client application reactions for failover and performance optimization testing techniques by simulating abrupt system/application/message engine's (e.g., broker) shutdowns, crashes, and stop/start events in an automated fashion, e.g., in a distributed or cloud computing environment.

Thus, it will be appreciated that there is a need in the art for improved testing techniques that are capable of simulating problems, e.g., in connection with testing how a client responds to the same, e.g., in connection with a messaging (e.g., publish/subscribe) model and/or application integration system including such a messaging model.

One aspect of certain example embodiments relates to addressing the problem of testing a real customer client-side failover reaction in a wide range of scenarios including actual message deliverer (e.g., broker) crashes. It will be appreciated that this testing may be performed in place of, or together with, testing "regular events" using a test script. These example techniques may be used in connection with a wide range of different network environments including, for example, distributed networks, cloud computing environments, etc. In certain example embodiments, the message sending/receiving may be managed according to a "publish/subscribe via a message deliverer scenario."

In accordance with certain example embodiments, a messaging system is provided. A broker cluster includes a plurality of brokers configured to relay messages from at least one publisher to at least one subscriber over one or more networked cluster connections in accordance with a predefined publish/subscribe model related policy. A test driver is configured to receive instructions regarding errors to be simulated in association with one or more components in the messaging system. A simulator is configured to simulate a network link and properties associated with the link. Processing resources include at least one processor and a memory configured to: (a) coordinate with the test driver and the simulator to selectively generate errors in one or more components of the messaging system, post-deployment and while it is live, in accordance with the script, and (b) determine whether the messaging system appropriately handled the errors selectively generated in response to the script.

In accordance with certain example embodiments, there is provided a testing system for use in a messaging system comprising a broker cluster including a plurality of brokers configured to relay messages from at least one publisher to at least one subscriber over one or more cluster connections in accordance with a predefined publish/subscribe model related policy. The testing system comprises a test driver configured to receive a script causing errors to be simulated in association with one or more components in the messaging system. A wide area network (WAN) (e.g., for use in a wireless network) simulator is configured to simulate a network link and properties associated with the link, with the properties including latency, jitter, bandwidth, and/or packet loss. Processing resources including at least one processor and a memory are configured to: (a) coordinate with the test driver and the simulator to selectively generate errors in one or more components of the messaging system, after the messaging system has been deployed and while it is live, in accordance with the script, and (b) determine whether the messaging system appropriately handled the errors selectively generated in response to the script. The messaging system is deployed in a distributed network or cloud computing environment, and the testing system is operable within that environment.

In accordance with certain example embodiments, there is provided a method of testing a messaging system comprising a broker cluster including a plurality of brokers configured to relay messages from at least one publisher to at least one subscriber over one or more cluster connections. Messages can be relayed from the at least one publisher to the at least one subscriber through the broker cluster in connection with a live, deployed broker system operating in accordance with the publish/subscribe model in a distributed network or cloud computing environment. A test driver configured to receive a script causing errors to be simulated in association with one or more components in the messaging system is provided. A WAN simulator configured to simulate a network link and properties associated with the link is provided, with the properties including latency, jitter, bandwidth, and/or packet loss. The test driver receives a script. In response to the test driver receiving the script, errors in one or more components of the messaging system, once it has been deployed and gone live, are selectively generated in connection with at least one processor coordinating between respective actions for the test driver and the simulator in accordance with the script. With the aid of the at least one processor, it is determined whether the messaging system properly handled the selectively generated errors, e.g., in accordance with predefined load-balancing and/or failover policies.

In certain example embodiments, non-transitory computer readable storage media tangibly storing instructions that, when executed by at least one processor of a computer, may perform one of these and/or other methods.

These features, aspects, advantages, and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

Certain example embodiments relate to a test driver that simulates broker outages related to broker crashes and/or broker stop/start events. For instance, in certain example embodiments, the test driver may read a script that includes an instruction flow that brings down the brokers similar to (or in a manner as inflicted by) broker crashes (e.g., where a process or application does not have a chance to save its state or data before it is terminated), and/or broker stop/start events, e.g., to simulate the problems and determine whether the client application remains intact in the presence of forced or unforced errors.

There are a variety of potential system/application crash instructions that may be used in connection with certain example embodiments, e.g., based in part on the operating system on which the broker is running. For instance, the Microsoft DOS "taskkill" command, the UNIX "kill-9" command, and/or equivalent commands on other platforms that support the clustering of brokers and the publish/subscribe model, may be used. The test driver may be extended in certain example scenarios to simulate broker crashes based on various factors such as, for example, memory usage, CPU time, service/process/daemon name, process ID, etc. This script not only helps to automate broker outages, but also potentially presents the user with opportunities to define broker failover scenarios.

As indicated above, example kill process commands may include, for example the Microsoft DOS command "taskkill", which simulates broker crashes using the service name:

```
taskkill /s [COMPUTERNAME] /u [DOMAIN\USERNAME] /p
[PASSWORD] /f /fi [Services eq
BROKERSERVER_SERVICE_NAME] /im *
```

The UNIX command "kill-9" may be used in connection with a process id:
Kill-9 [PID]

Test results can be verified in certain example instances by verifying the total number of messages received at the client end, e.g., as defined by the cluster policy. However, it will be appreciated that checking whether the test(s) have succeeded or failed is not limited to simply determining whether the number of messages matches, and other techniques may be used. For instance, it may be possible to check client status, implement the request/reply model (e.g., to ask for acknowledgements and/or failure messages), issue pings, etc. It is noted that similar techniques may be used in validating test results.

In connection with an example validation mechanism, a test can be marked as failed when the subscriber application receives a number of messages that is less than the number of published messages after certain conditions are met and/or requests are timed out. A last received message timestamp may be stored by the creating a suitable corresponding object or a test log file, e.g., to help in computing the next expected message time-out. The current timestamp may be replaced with a recently received message's client application's system time. The test may wait a predetermined amount of time until the next message is received, with this predetermined amount of time in certain example embodiments being configurable and/or set to the maximum amount of time taken to receive the largest message that is used in testing. The test waiting time can be extended using optionally configurable iterations. Error logs may be maintained, and such logs may be scanned with certain entries being flagged for possible follow-up.

In contrast, the test can be marked as passed when the subscriber-side application receives messages exactly equal to the number of published messages or defined by test criteria, with a condition being that there are no lingering messages already in the system (e.g., that in turn might provide a false indication of a subscriber receiving more messages than the publisher pushed into the system). A potential exception to this test scenario is that duplicate messages some times are expected under failover conditions. In such circumstances, the test may be terminated only when it is timed out.

In some cases manual validation may be performed, e.g., in connection with message logging features. The webMethods message logging suite of tools, for example, help log messages when a message is published or republished, a message is received, an error occurs, and connectivity changes.

In certain example embodiments, the example test driver and the example test result verification techniques described herein may be integrated with existing publish/subscribe testing tools, developed as a stand-alone (e.g., GUI-driven) tool providing test driver capabilities, etc., and optionally provided for use with application integrations built around the publish/subscribe model (or one of its variant) in which messages are exchanged asynchronously through messaging engines (e.g., brokers) organized in a cluster.

Certain example embodiments may relate to the JMS messaging standard, which allows application components based on the Java Enterprise Edition (JEE) to create, send, receive, and/or read messages. Of course, it will be appreciated that the example techniques described herein may be used in connection with other publish/subscribe scenarios using a message engine (such as, for example, a broker), that potentially do not use JMS or JEE.

The example techniques described herein may be applied to a wide variety of different architectures including, for example, a distributed system (e.g., including multiple autonomous computers that communicate through, over, and/or via a computer network), cloud computing environments (e.g., that may involve multiple cloud components communicating with each other over a loose coupling mechanism such as a messaging queue), client-server networks, 3-tier architecture, n-tier architecture, distributed objects, loose coupling, or tight coupling.

Figure 1:
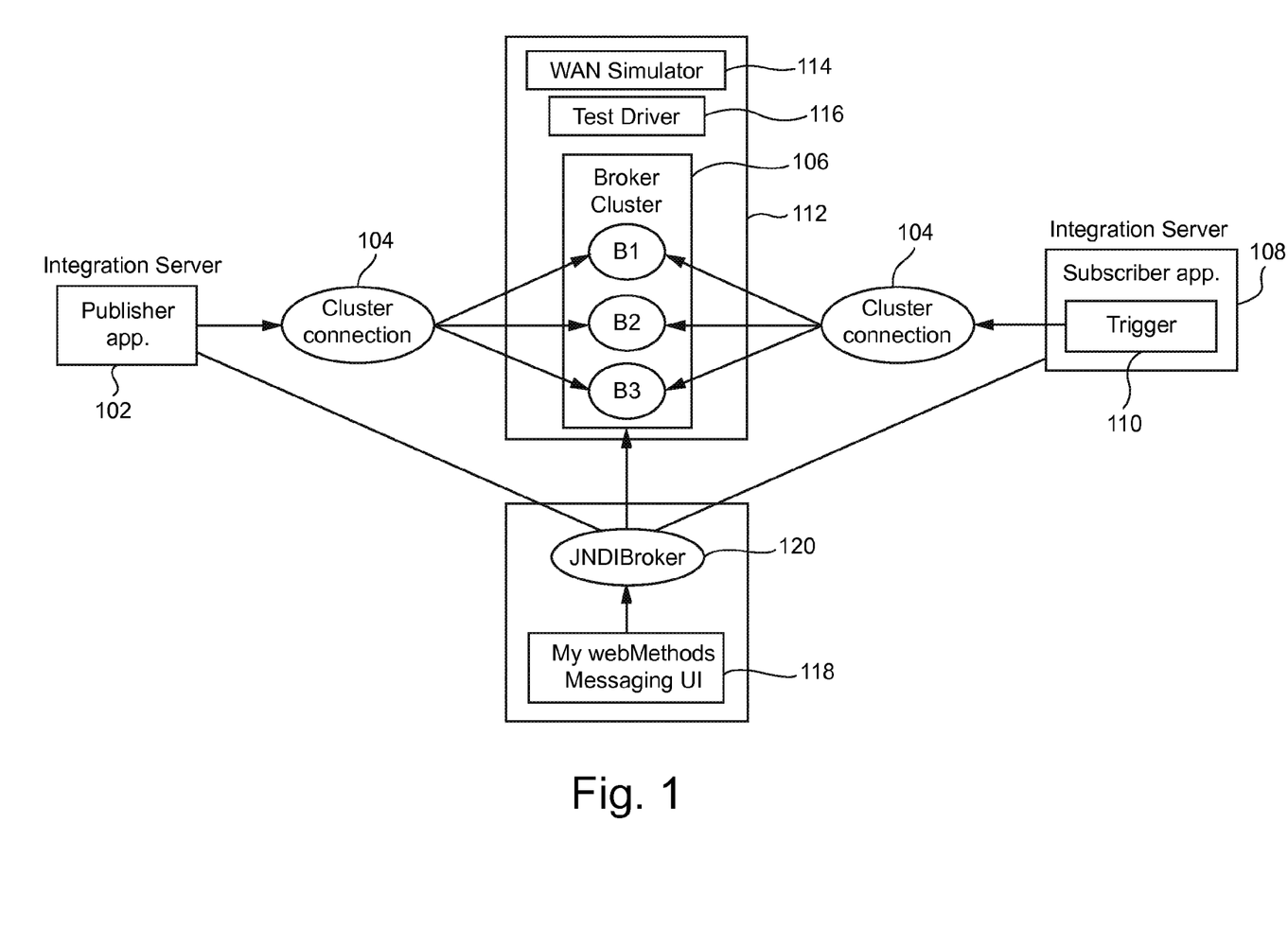
FIG. 1 is a high-level schematic view of a testing setup including publisher and subscriber applications associated with cluster connections and broker connections to a plurality of brokers in a broker cluster, in accordance with certain example embodiments.

Referring now more particularly to the drawings, FIG. 1 is a high-level schematic view of a testing setup including publisher and subscriber applications associated with cluster connections and broker connections to a plurality of brokers in a broker cluster, in accordance with certain example embodiments. As shown in FIG. 1, a test system may include a publisher client application 102, an example of which is the webMethods Integration Server. Integration Server may be associated with a cluster connection 104 defined in connection with a load-balancing policy. Integration Server may host packages that include services and related files (not shown in FIG. 1).

For example, Integration Server may comprise packages that include built-in services that developers want to invoke from their services or client applications, services that expose some of the features of Integration Server, etc. Using JMS-related packages and/or built-in services provided by the Integration Server, a publisher client application 102 may be configured to generate and send a message to a broker using the cluster connection 104 as defined by cluster policy. The cluster connection 104 may be connected to a broker cluster 106 comprising a plurality of brokers B1, B2, and B3, with each broker in the broker cluster 106 being configured to relay messages from the publisher client application 102 to at least one subscriber client application 108.

As alluded to above, the cluster connections 104 between the publisher application 102 and the subscriber application 108 may be defined in connection with a cluster policy that provides load-balancing associated with client applications. For instance, webMethods JMS cluster policies may be based on one or more of the following and/or other policies:

A round-robin load-balancing policy, wherein messages are sent to each of the available brokers in the cluster in a sequential fashion;

A sticky load-balancing policy, wherein a particular broker is published to until a failure occurs, at which time a different broker is picked up and published to;

Random allocation, wherein a broker is selected randomly at run-time;

A weighted round-robin policy, in which each broker is assigned a weight that signifies, relative to the other brokers, how well that broker server performs and thus how many more or fewer messages may be sent to each broker compared to the other brokers; and A multi-send policy that enables message routing to multiple brokers.

The subscriber client application 108 may support or provide a trigger subsystem 110 that provides a resource for message processing, an example of which is the webMethods Integration Server's JMS trigger facility. See also, for example, U.S. Pat. No. 8,136,122 and U.S. Publication Nos. 2010/0333111 and 2010/0251262, the entire contents of which are hereby incorporated herein by reference. A JMS trigger is a trigger that provides a resource for message processing and receives messages from a destination (queue or topic) on a JMS provider and then processes those messages. A JMS trigger may be associated with a cluster connection and a destination (e.g., queue or topic).

The broker cluster 106 in FIG. 1 provides a messaging infrastructure that routes messages between the publisher application 102 and one or more subscriber applications 108 or across integration applications. The webMethods broker, for example, supports clustered brokers as shown in FIG. 1. In the FIG. 1 example, brokers B1, B2, B3 form a cluster 106. In a conceivable real-time scenario, brokers B1, B2, and B3 may b e located in three different geographical regions but nonetheless form a cluster connected by a wide area network (WAN) link. In addition to the above-identified patent documents, see also U.S. Publication No. 2010/0325252, the entire contents of which is hereby incorporated herein by reference.

A network simulation tool 114 also may be provided. The network simulation tool 114 may be, for example, a software product such as, for example, Shunra VE Desktop 4.01. Regardless of its implementation, however, the network simulation tool 114 may help simulate a wide area network link and its properties including, for example, latency, jitter, bandwidth and packet loss. This may enable users to test applications under a variety of current and potential network conditions, directly from their desktops. With this insight, users may be able to more easily find and fix application and network related performance problems before and/or after deployment/in a real production environment. For instance, clues may be derived from testing with different amounts of packet loss, high latency, low bandwidth, etc., in connection with the real production environment.

A test driver 116 may interface with a script (which may be user programmed and optionally may be stored on a non-transitory computer readable storage medium). The test driver 116 may function under the control of processing resources (including at least one processor and a memory) of a computer system and in accordance with the script. The script may include an instruction flow concerning whether, when, and how to simulate a broker problem. For instance, the script may define a broker outage similar to (or inflicted by) a broker crash (e.g., where a process or application does not have a chance to save its state or data before it is terminated), a broker stop/start event, etc. An example script is set forth below:

```
:: ************** TestDriver***********************
:: taskkill command kills process based on filter string like
service name, image name, memory uage, CPU time,
:: sessions, Hostname, User, status, PID to inflict Broker or
application crash.
:: taskkill on exit returns status, process and process ID.
:: SC is a command line program used for communicating with the
:: Service Control Manager and services.
:: Broker Monitor is the separate process thats runs on the machine
that hosts Broker Server.
:: Broker Monitor has three functions: a) It starts the Broker
Servers,
:: b) it monitors the state of Broker servers running on the host
machine and
:: automatically attempts to restart them if they fail. c) It logs
the status of Broker Servers.
:: ***********************************************
:: Ex: taskkill command kills all Broker Servers hosted on host1 and
service name equals to webMethodsBroker
    taskkill /s host1 /u domain\user1 /p password1 /f /fi "Services
eq webMethodsBroker" /im *
:: SLEEP 300 seconds.
    SLEEP 300
:: Ex: crashes Broker Server which is hosted on host2 based on image
name "awbroker.exe"
    taskkill /s host2 /u domain\user2 /p password2 /f /im
awbroker.exe
:: SLEEP 300 seconds.
    SLEEP 300
:: Ex: crashes Broker Server which is hosted on host3 based on
memory usage.
    taskkill /s host3 /u domain\user3 /p password3 /f /fi "Memusage
gt 10000" /im awbroker.exe
:: SLEEP before executing next command, sleep for 3600 seconds .
    SLEEP 3600
:: Ex: crashes subscriber client application which is hosted on
host4.
    taskkill /s host4 /u domain\user4 /p password4 /f /fi "Username
eq user4" /im * /t
:: SLEEP 600 seconds.
    SLEEP 600
:: Stop Broker on host1
    sc \\host1 stop brokerService1
:: SLEEP 20 seconds.
    SLEEP 20
:: Start Broker on host1
    sc \\host1 start brokerService1
:: Stop Broker on host2,host3
    sc \\host2 stop brokerService2
    sc \\host3 stop brokerService3
:: SLEEP 300 seconds.
    SLEEP 300
:: Start Broker on host2, host3
    sc \\host2 start brokerService2
    sc \\host3 start brokerService3
```

It will be appreciated that the order of the instructions may be varied and that they need not necessarily follow the order of the example script provided above.

In addition, it will be appreciated that the timing between the test events need not necessarily be fixed. For instance, the timings may be generated using a random function in certain example embodiments. In this regard, the following example involves random timings:

```
:: Ex: crashes Broker Server which is hosted on host2 based on image
name "awbroker.exe"
    taskkill /s host2 /u domain\user2 /p password2 /f /im
awbroker.exe
:: RANDOM is a Dynamic Environment Variable, computed each time the
variable is expanded. A random decimal number between 0 and 32767
    SLEEP %RANDOM%
:: Ex: crashes Broker Server which is hosted on host3 based on
memory usage.
    taskkill /s host3 /u domain\user3 /p password3 /f /fi "Memusage
gt 10000" /im awbroker.exe
```

Referring once again to FIG. 1, a user interface tool 118 may be coupled with a JNDI provider 120. As is known, the Java Naming and Directory Interface is a Java API for a directory service that allows Java software clients to discover and look up data and objects via a name. The user interface 118 may, for example, enable a user to create cluster by selecting multiple brokers, JNDI objects like connection factory and destinations (e.g., queue or topic), etc.

As shown in the FIG. 1 example, the test system 112 includes the broker cluster 106, as well as the WAN simulator 114 and the test driver 116. However, this need not necessarily be the case. For instance, the test driver 116 may be incorporated into the broker architecture in certain example embodiments. In other cases, the publisher application 102 and/or the subscriber application 108 may be considered a part of the broader test system 112.

Figure 2:
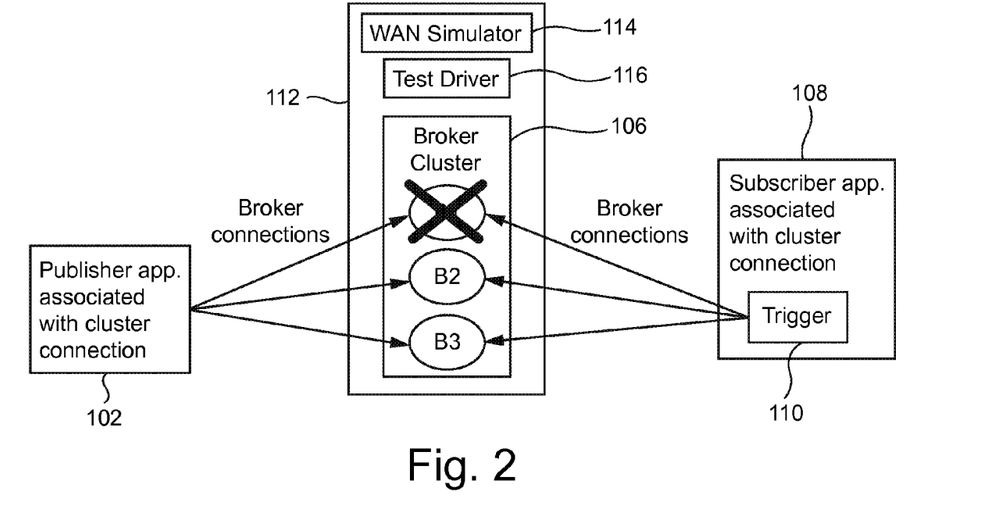
FIG. 2 is a simulated failure in which cluster broker B1 from the FIG. 1 example go offline, in accordance with an example test scenario.
Figure 3:
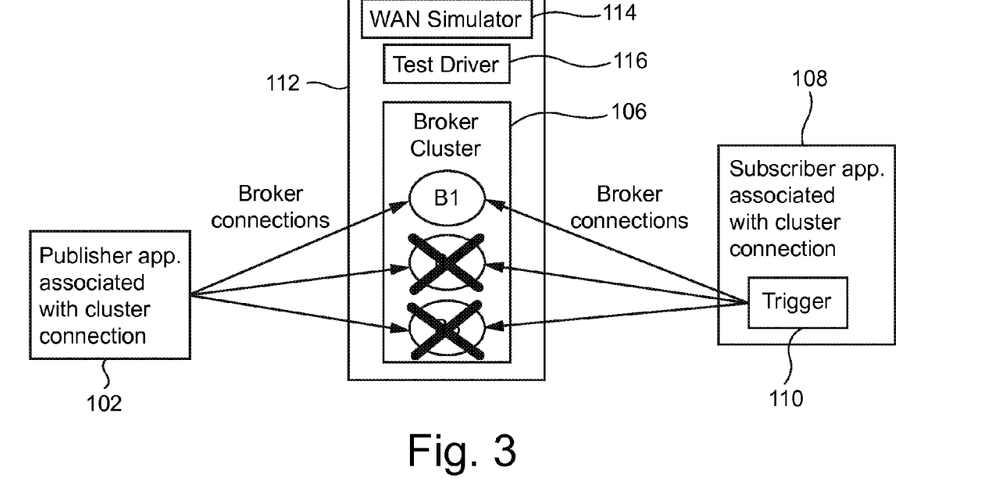
FIG. 3 is a simulated failure in which cluster brokers B2 and B3 from the FIG. 1 example go offline, in accordance with an example test scenario.

FIGS. 2-6 schematically illustrate common problems that may be simulated using the techniques of certain example embodiments. For example, FIGS. 2-3 depict various brokers going offline. In such cases, subsequent published messages should be directed to other online brokers, providing transparency to the publisher/subscriber client applications. For instance, in connection with FIG. 2, when broker B1 goes offline, thereafter subsequent published messages are sent to other online Brokers, in accordance with user-defined cluster connection policy. In the FIG. 2 example, subsequent messages are processed through broker B2 or B3. Similarly, in FIG. 3, subsequent published messages sent to only online broker B1, because brokers B2 and B3 are offline. The FIG. 2 and FIG. 3 example scenarios may be simulated, for example, by physically disconnecting the connections, or by having the WAN simulator 114 instruct incoming connections to certain brokers in the broker cluster to be refused.

In view of the user-defined cluster connection policy, when one or more brokers in the broker cluster 106 go down, the publisher application 102 should continue to publish messages to any active brokers in the broker cluster 106, and the subscriber 108 should continue to receive messages from active brokers in the cluster successfully, in a transparent manner and without facing any significant problems or interruptions. When a broker in the broker cluster 106 is restored from a crash or an abrupt stop, the publisher and subscriber applications 102 and 108 may continue with their respective publish/subscribe operations in connection with the restored broker, e.g., so that operation is continued transparently.

Figure 4:
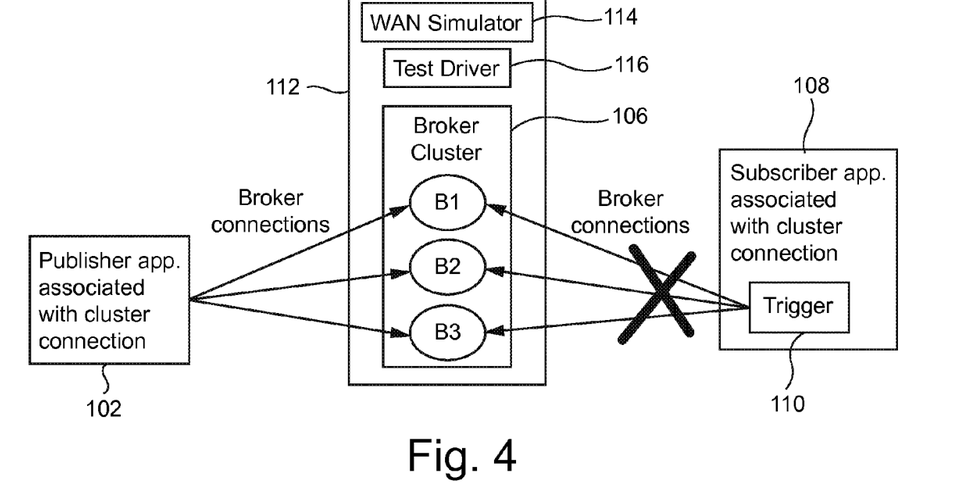
FIG. 4 is a simulated network failure in which the network link between the subscriber application and the broker cluster from the FIG. 1 example is broken, in accordance with an example test scenario.

FIG. 4 is a simulated network failure in which the network link between the subscriber application and the broker cluster from the FIG. 1 example is broken, in accordance with an example test scenario. Under such circumstances, it would be desirable to help ensure that enterprise applications connected across the WAN link are maintained without halting the production environment, even in the face of potentially frequent network failures. Frequent network failure simulation may be accomplished by simply removing the application network wire/plug, or by software simulation, e.g., in connection with the WAN simulator 114. Tests may be performed to help ensure that a subscriber 108 (or message consumer) establishes a connection to the broker when the network line is restored and thereafter resumes message receipt. It will be appreciated that a composite cluster connection may be provided in certain example embodiments (e.g., as shown, for example, in FIG. 8) to help overcome some of these issues. In such cases, messages could be routed along one or more working network lines or child connections, should one or more others fail, thus helping to avoid the complete halt to all operations.

Figure 5:
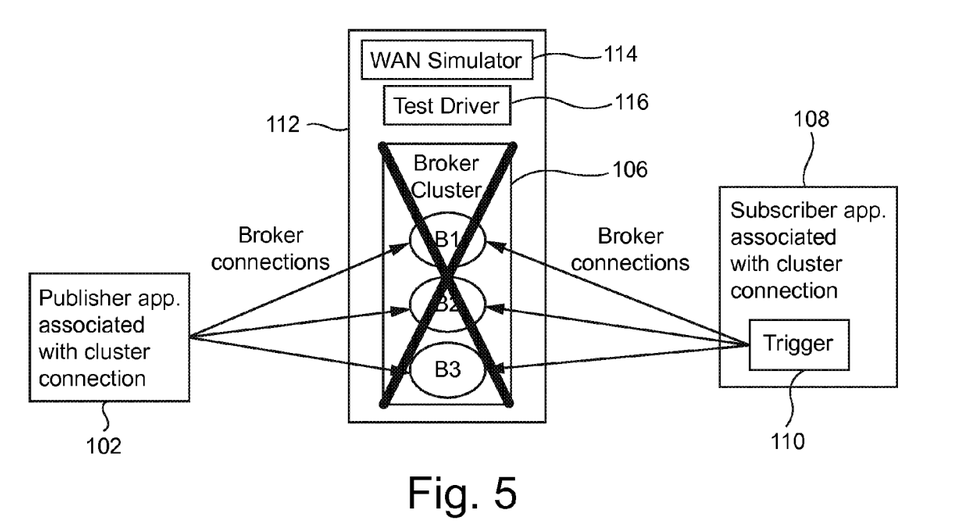
FIG. 5 is a simulated failure in which the entire cluster from the FIG. 1 example goes offline, in accordance with an example test scenario.

FIG. 5 is a simulated failure in which the entire cluster from the FIG. 1 example goes offline, in accordance with an example test scenario. In such scenarios, it would be desirable to make sure that messages are queued at the publisher 102 and ultimately delivered to the subscriber 108 when the broker cluster 106 is brought back online. Such a scenario may be simulated by physically disconnecting incoming and outgoing connections from the broker cluster 106, and/or through software such as, for example, by having the WAN simulator 116 instructing incoming connection requests (e.g., from the publisher 102 and/or the subscriber 108) refused and halting all outgoing transmissions.

Figure 6:
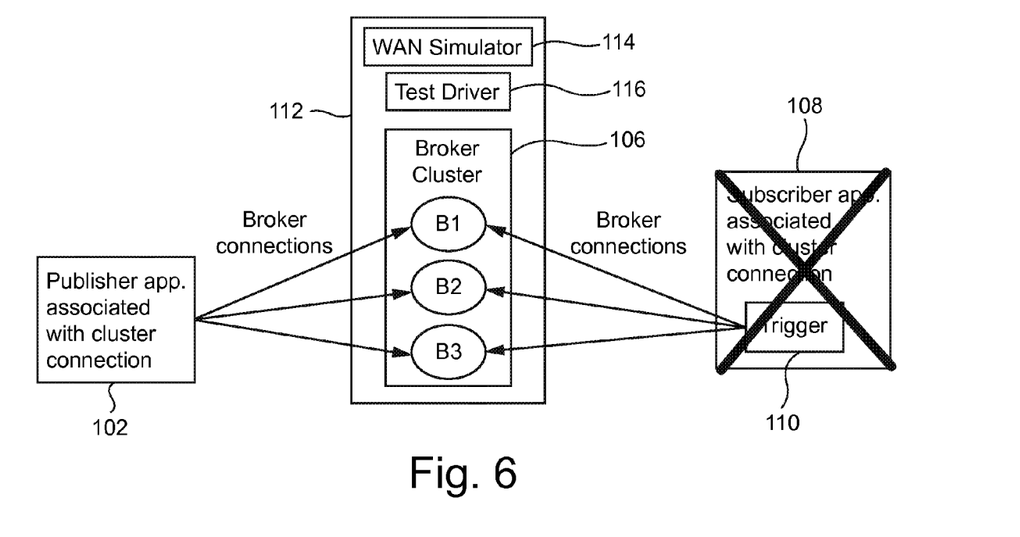
FIG. 6 is a simulated failure in which the subscriber application/system in the FIG. 1 example is crashed or restarted abruptly, in accordance with an example test scenario.

FIG. 6 is a simulated failure in which the subscriber application/system in the FIG. 1 example is crashed or restarted abruptly, in accordance with an example test scenario. In such a scenario, it would be desirable to make sure that messages are delivered to the subscriber 108 when it comes back online. To this end, messages may be queued by the brokers and delivered when the subscriber 108 comes back online. Messages may be delivered the requisite number of times and no more, and may be delivered the right number of times to the right subscribers when multiple subscribers are to receive the message. Such a scenario may be simulated by physically disconnecting the link to the subscriber 108, and/or having the WAN simulator 114 prevent connections to the subscriber 108.

Figure 7:
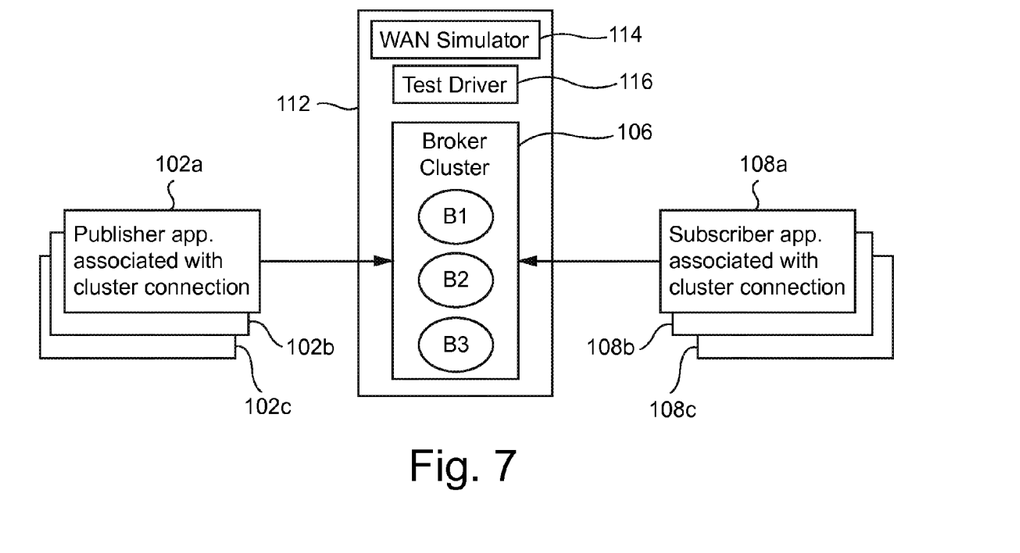
FIG. 7 is a high-level schematic view of a testing setup including plural publisher and subscriber application instances connected to a cluster, in accordance with certain example embodiments.

FIG. 7 is a high-level schematic view of a testing setup including plural publisher (102*a*, 102*b*, and 102*c*) and subscriber (108*a*, 108*b*, and 108*c*) application instances connected to a cluster, in accordance with certain example embodiments. The FIG. 7 example system is similar to the FIG. 1 example system, except that it includes multiple publisher application and multiple subscriber applications. The plural publisher (102*a*, 102*b*, and 102*c*) and subscriber (108*a*, 108*b*, and 108*c*) instances may be connected to the broker cluster 106 and perform publish/send or subscribe/receive for messages of different sizes (e.g., 1 KB to 20 MB). The same or similar test scenarios as those set forth above may be performed with respect to some or all of the components in the FIG. 7 example. For instance, some or all of the brokers may be shut down as to some or all of the publisher applications, some or all of the subscriber applications may be taken down, etc.

Figure 8:
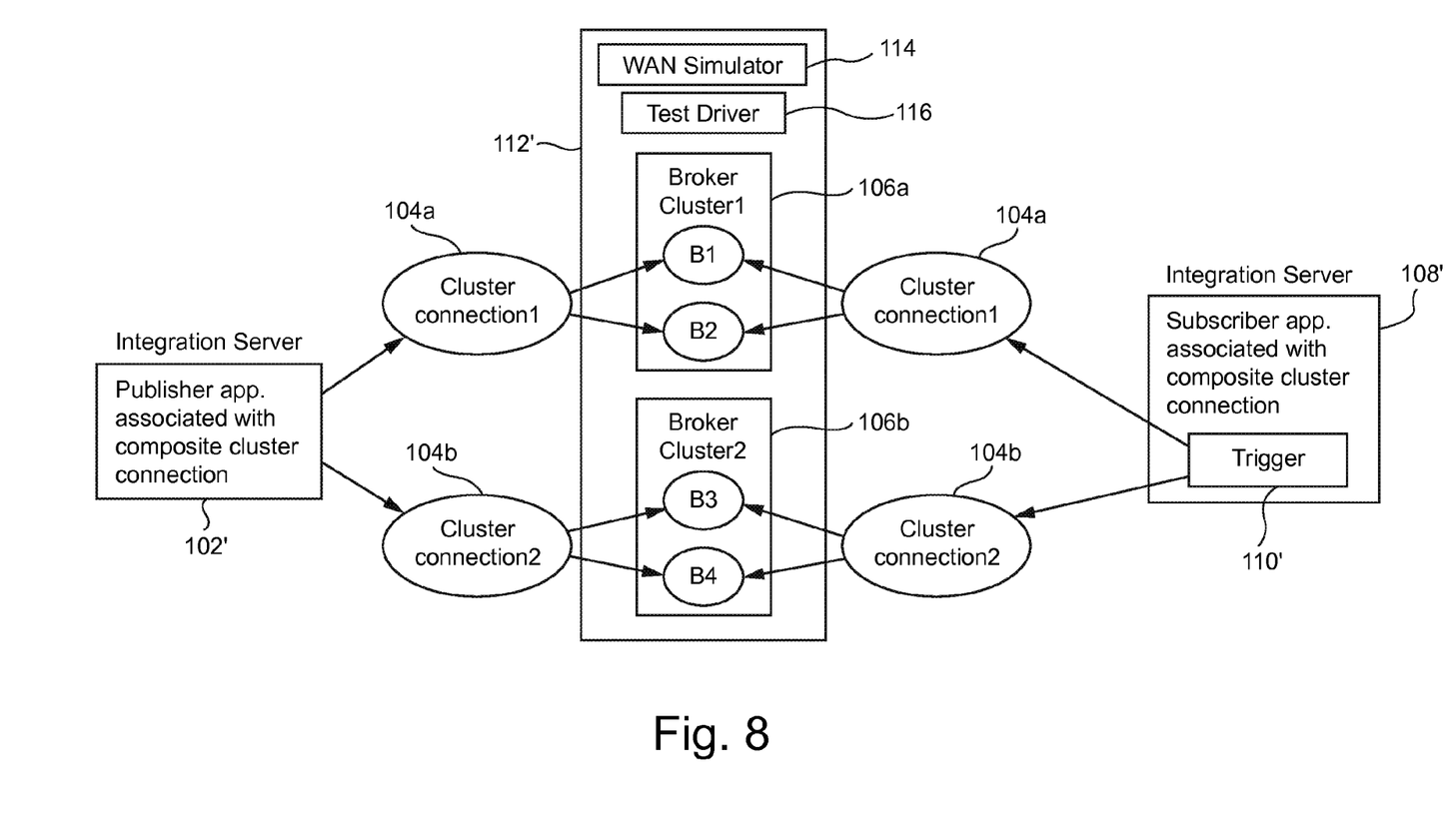
FIG. 8 is a high-level schematic view of a testing setup including publisher and subscriber applications in a composite cluster environment, in accordance with certain example embodiments.

As indicated above, FIG. 8 is a high-level schematic view of a testing setup including publisher and subscriber applications in a composite cluster environment, in accordance with certain example embodiments. The different cluster connections 104 *a-b* connect the publisher application 102' and the subscriber application 108' to different broker clusters 106 *a-b*, including brokers B1-B2 and B3-B4, respectively, in the test system 112'. A composite cluster connection is a collection of cluster connections. Composite cluster connections may help enable users to use two levels of load balancing policies. For instance, each child cluster connection of the composite cluster connection can have a different load balancing policy, and the composite cluster connection may have a separate load balancing policy. As above, the FIG. 8 example system is similar to the FIG. 1 example system, and the same or similar test scenarios as those set forth above may be performed with respect to some or all of the components in the FIG. 8 example system. For example, the subscriber client application 108' may support or provide a trigger subsystem 110'.

EXAMPLE

Figure 9:
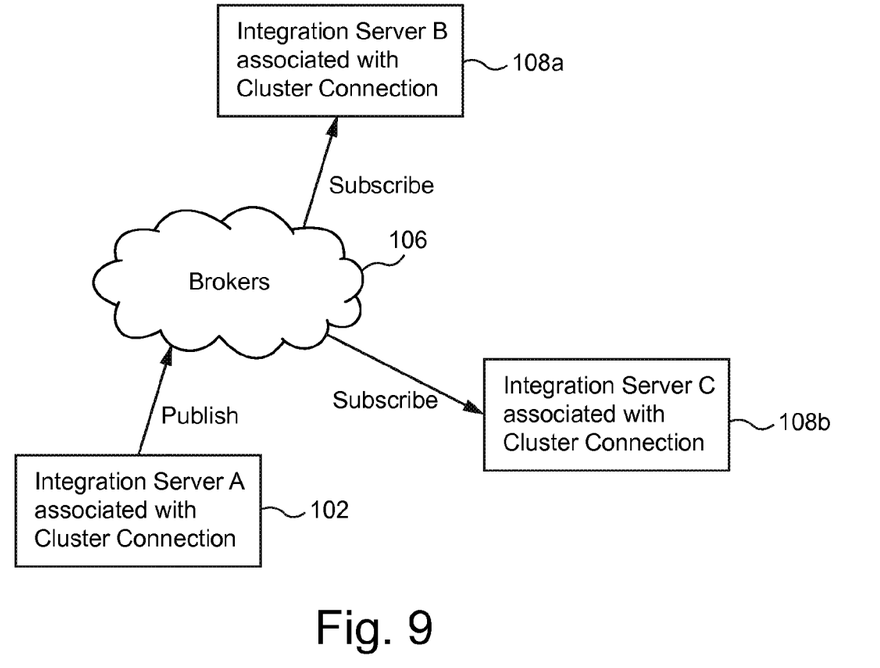
FIG. 9 is a high-level view of a typical scenario in which one publisher provides messages to plural subscribers in connection with the publish/subscribe model.

FIG. 9 is a high-level view of a typical scenario in which one publisher provides messages to plural subscribers in connection with the publish/subscribe model. In a typical setup, Integration Servers A, B, and C may reside in different countries. For instance, the Integration Servers A, B, and C may be parts of central banks' messaging framework, and correspond to the European Central Bank, the U.S. Federal Reserve, and the Reserve Bank of India. The framework may communicate using the publish/subscribe model, with messaging potentially being JMS-based. Thus, a document published from IS-A 102 is a single action, with transparency to the developer about the broker infrastructure 106 being published to. For instance, subscriptions on IS-B 108*a* and IS-C 108*b* and receipt of documents provide transparency to the developer about the broker infrastructure 106 being subscribed to. Example operational scenarios are provided in detail below in connection with this illustrative framework, and set forth the actual and desired actions in connection with problem cases. The testing techniques may simulate these problems and determine whether the outcomes are desirable, indicating that the problem has been handled appropriately.

Scenario 1, Normal Operations: In this scenario, all components are active and functioning normally. A single document is published by IS-A 102. Both IS-B 108*a* and IS-C 108*b* separately have triggers that subscribe to the document published by IS-A 102. The relevant service triggered by the document runs exactly once on each of IS-B 108*a* and IS-C 108*b*.

Scenario 2, Publish to the Broker Action Fails Before Publish is Complete: All components are active and functioning normally, except that one of the brokers in the broker infrastructure 106 to which IS-A 102 is connected has failed. A single document is published by IS-A 102. IS-B 108*a* and IS-C 108*b* have separate triggers that subscribe to the document published by IS-A 102. When the Broker is restored, the document is not redelivered to IS-B 108*a* or IS-C 108*b*. The relevant service triggered by the document runs exactly once on each of IS-B 108*a* and IS-C 108*b*.

Scenario 3, Publish to the Broker Action Fails During Publish: All components are active and functioning normally. A single document is published by IS-A 102, but one of the brokers to which IS-A 102 is connected fails before the document is acknowledged. IS-B 108a and IS-C 108b have separate triggers that subscribe to the document published by IS-A 102. When the Broker is restored, the document is not redelivered to IS-B 108a or IS-C 108b. The relevant service triggered by the document runs exactly once on each of IS-B 108a and IS-C 108b.

Scenario 4, Subscriber to Broker Connection Fails Before Publish: All components are active and functioning normally, except that one of the brokers to which IS-B 108a is connected has failed. A single document is published by IS-A 102, but one of the brokers to which IS-A 102 is connected fails before the document is acknowledged. IS-B 108a and IS-C 108b have separate triggers that subscribe to the document published by IS-A 102. When the Broker is restored, the document is not redelivered to IS-B 108a or IS-C 108b. The relevant service triggered by the document runs exactly once on each of IS-B 108a and IS-C 108b.

Scenario 5, Subscriber to Broker Connection Fails During Publish: All components are active and functioning normally. IS-B 108a and IS-C 100 have separate triggers that subscribe to the document published by IS-A 102. When the Broker is restored, the document is not redelivered to IS-B 108a or IS-C 108b. The relevant service triggered by the document runs exactly once on each of IS-B 108a and IS-C 108b.

Although certain example scenarios have been described above, it will be appreciated that other problem/test scenarios may be provided for in certain example embodiments. It also will be appreciated that certain example embodiments may be extended to test the operations of either or both of the publish/subscribe model (e.g., in which a topic is published once and potentially received by multiple subscribers, since multiple subscribers can subscribe to a single topic with each subscriber ultimately receiving a copy of the same message) and/or a point-to-point model (e.g., using a queued approach where a message is delivered directly to a single consumer, with multiple consumers being lined up in a queue).

Test validations may be performed automatically in certain example embodiments. For instance, as indicated above, a test can be marked as failed when the subscriber application receives a number of messages that is less than the number of published messages after certain conditions are met and/or requests are timed out. A last received message timestamp may be stored by the creating a suitable corresponding object or a test log file, e.g., to help in computing the next expected message time-out. The current timestamp may be replaced with a recently received message's client application's system time. The test may wait a predetermined amount of time until the next message is received, with this predetermined amount of time in certain example embodiments being configurable and/or set to the maximum amount of time taken to receive the largest message that is used in testing. The test waiting time can be extended using optionally configurable iterations. Error logs may be maintained, and such logs may be scanned with certain entries being flagged for possible follow-up.

Test validations may be performed automatically in certain example embodiments. For instance, a test can be marked as passed or failed based on the total number of messages received at the client end, e.g., as defined by cluster policy. Example test validation steps may be applied or repeated after every test driver request (e.g., broker crash or stop/start), and/or the test report may be generated on each error or disrupt action, or periodically. Similarly, for a cloud or distributed environment, the test validation can be done using request/reply model messages and/or pings. In the request/reply model, for example, after every test driver request (e.g., crash or stop/start), a request may be sent and the reply (e.g., acknowledgement or response) from client may be waited for. In such cases, the response message may contain details of the client status or an acknowledgement. Error logs may be maintained, and such logs may be scanned with certain entries being flagged for possible follow-up.

The testing techniques discussed above may help in collecting data for analyzing message traffic, assessing load on active brokers in one or more clusters, monitoring performance, duplicate detection, determining data loss and/or corruption, CPU/memory consumption (e.g., related to abrupt disruptions or errors), etc. Test validations may also be extended to include these and/or other parameters.

The test may be marked as passed when the subscriber-side application receives messages exactly equal to the number of published messages, with a condition being that there are no lingering messages already in the system (e.g., that in turn might provide a false indication of a subscriber receiving more messages than the publisher pushed into the system). In certain example implementations, however, a greater number of received messages than actually published messages may be acceptable, since duplicate messages may be acceptable under certain failover conditions. A test may be terminated when it is timed out.

In contrast, the test can be marked as passed when the subscriber-side application receives messages exactly equal to the number of published messages, with a condition being that there are no lingering messages already in the system (e.g., that in turn might provide a false indication of a subscriber receiving more messages than the publisher pushed into the system). A potential exception to this test scenario is that duplicate messages some times are expected under failover conditions. In such circumstances, the test may be terminated only when it is timed out.

In some cases manual validation may be performed, e.g., in connection with message logging features. The webMethods message logging suite of tools, for example, help log messages when a message is published or republished, a message is received, an error occurs, and connectivity changes.

Figure 10:
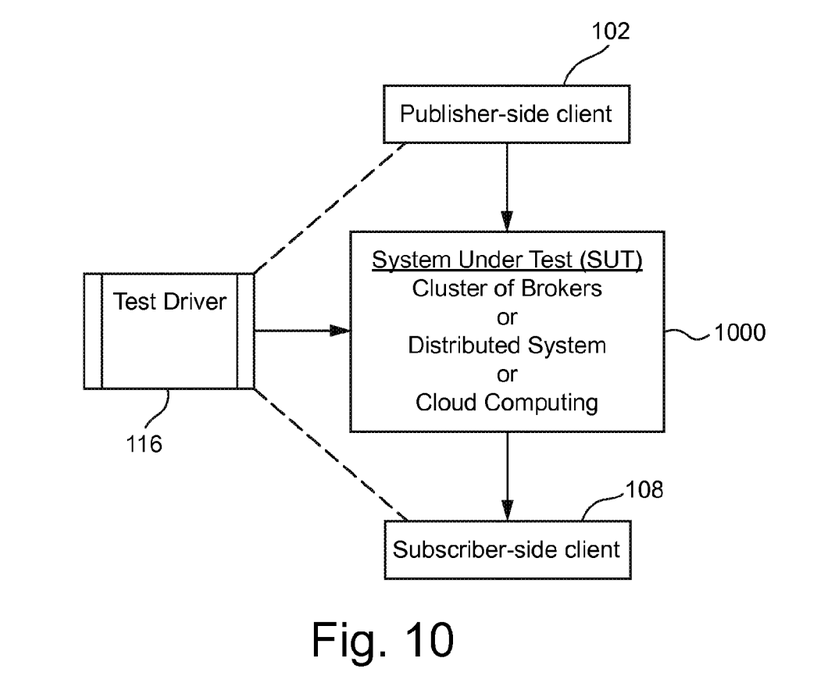
FIG. 10 is a high-level view of testing setup environment in accordance with certain example embodiments.

FIG. 10 is a high-level view of testing setup environment in accordance with certain example embodiments. As shown in FIG. 10, the test driver 116 has direct or indirect communication with the publisher-side client 102 and the subscriber-side client 108, as well as the system under test (SUT) 1000. The SUT 1000 may include one or more clusters of brokers in a distributed or cloud computing environment. As indicated above, the test driver 116 may read a script that includes an instruction flow that selectively affects one or both of the clients 102 and/or 108, and/or the SUT 1000. Data regarding how the overall system behaves then may be captured and subsequently analyzed, e.g., to determine whether simulated outages or other problems are suitably handled (e.g., whether messages are delivered at all, in a timely fashion, in a not overly redundant manner, etc.).

Figure 11:
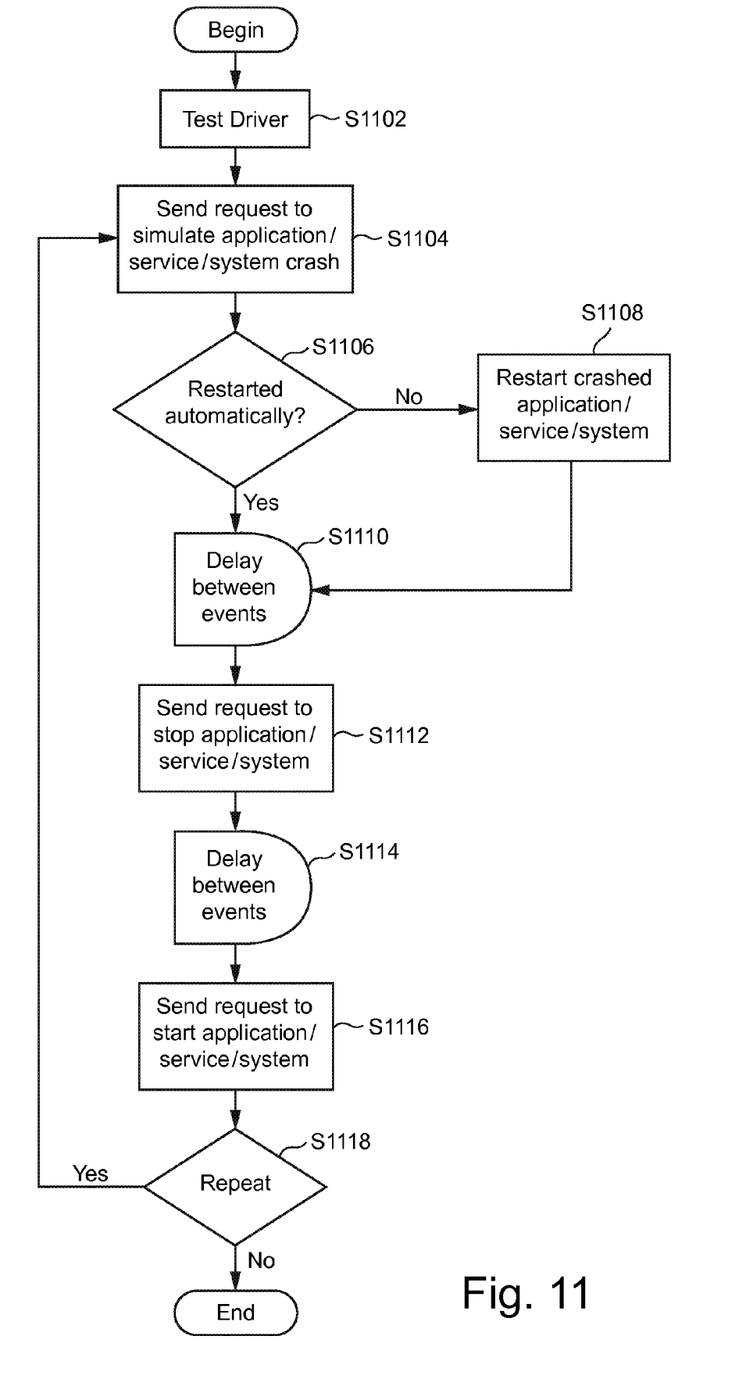
FIG. 11 is a test driver flow in accordance with certain example embodiments.

FIG. 11 is a test driver flow in accordance with certain example embodiments. In other words, the FIG. 11 flowchart may be indicative of the test instructions that are fed into the test driver 116 in certain example embodiments. Of course, it will be appreciated that the various steps shown in FIG. 11, and their orders, are provided by way of example only, and that these and/or other steps may be provided in any appropriate order in different example scenarios. In any event, as shown in FIG. 11, the test driver is initially provided in step S1102. It then sends a request to simulate an application, service, system, and/or other crash, in step S1104. A determination is made as to whether the crashed component is restarted automatically in step S1106. If not, then the crashed component is restarted in step S1108. If so, then a delay between simulated events is imposed in step S1110. A second request to simulate a stop of a component such as an application, service, system, etc., is sent in step S1112. Another delay is imposed in step S1114, and a third request to simulate a stop of a component is sent in step 1116, etc. In step S1118, a decision may be made as to whether to repeat this procedure. If so, then the process returns to step S1104 or other suitable point. If not, then the process is ended.

Data about how the components perform when problems are simulated may be gathered during and/or after the flow. For instance, the number of messages ultimately received may be compared with the number of messages actually sent or intended to be sent. Further checks may be performed to determine whether the same message was received too many times by a single subscriber and/or not enough times by another subscriber, etc. Such analysis may be performed automatically or manually, e.g., as set forth above.

It will be appreciated that as used herein, the terms system, subsystem, service, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate transitory or non-transitory/tangible computer readable storage medium. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A messaging system, comprising:
a broker cluster including a plurality of brokers configured to relay messages from at least one publisher to at least one subscriber over one or more networked cluster connections in accordance with a predefined publish/subscribe model related policy;
a test driver configured to receive instructions regarding errors to be simulated in association with one or more components in the messaging system;
a simulator configured to simulate a network link and properties associated with the link; and
processing resources including at least one processor and a memory configured to:
coordinate with the test driver and the simulator to selectively generate errors in one or more components of the messaging system, post-deployment and while it is live, in accordance with the instructions, and
determine whether the messaging system appropriately handled the errors selectively generated in response to the instructions, wherein
errors that are simulatable in association with one or more components in the messaging system include a partial subset of brokers in the broker cluster going offline, the entire broker cluster going offline, a disconnect between some or all broker connections to the at least subscriber, a broker start/stop event, and the at least one subscriber going offline.

2. The system of claim 1, wherein each said subscriber includes a trigger subsystem configured to process incoming messages.

3. The system of claim 2, wherein incoming messages are JMS messages.

4. The system of claim 1, wherein it is determined that the messaging system appropriately handled the errors selectively generated in response to the instructions when the messaging system operates in accordance with user-specified load-balancing and/or failover policies.

5. The system of claim 1, wherein the at least one publisher sends messages and it is determined that the messaging system appropriately handled the errors selectively generated in response to the instructions when the messaging system ensures that at least a number of messages sent by the at least one publisher is received by the at least one subscriber, as intended.

6. The system of claim 1, wherein it is determined that the messaging system appropriately handled the errors selectively generated in response to the instructions when the messaging system ensures that an exact number of messages sent by the at least one publisher is received by the at least one subscriber, as intended.

7. The system of claim 1, wherein properties associated with the link include latency, jitter, bandwidth, and/or packet loss.

8. The system of claim 1, wherein the messaging system is deployed in a distributed network or cloud computing environment.

9. The system of claim 1, further comprising a plurality of publishers and/or subscribers.

10. The system of claim 1, further comprising multiple broker clusters and composite cluster connections as between the at least one publisher and multiple broker clusters, and as between the at least subscriber and the multiple broker clusters, each said broker cluster including one or more brokers.

11. A testing system for use in a messaging system comprising a broker cluster including a plurality of brokers configured to relay messages from at least one publisher to at least one subscriber over one or more cluster connections in accordance with a predefined publish/subscribe model related policy, the testing system comprising:
a test driver configured to receive a script causing errors to be simulated in association with one or more components in the messaging system;
a wide area network (WAN) simulator configured to simulate a network link and properties associated with the link, the properties including latency, jitter, bandwidth, and/or packet loss; and
processing resources including at least one processor and a memory configured to:
coordinate with the test driver and the simulator to selectively generate errors in one or more components of the messaging system, after the messaging system has been deployed and while it is live, in accordance with the script, and
determine whether the messaging system appropriately handled the errors selectively generated in response to the script,
wherein the messaging system is deployed in a distributed network or cloud computing environment, and the testing system is operable within that environment, and
wherein errors that are simulatable in association with one or more components in the messaging system include a partial subset of brokers in the broker cluster going offline, the entire broker cluster going offline, a disconnect between some or all broker connections to the at least subscriber, a broker start/stop event, and the at least one subscriber going offline.

12. The system of claim 11, wherein it is determined that the messaging system appropriately handled the errors selectively generated in response to the script when the messaging system operates in accordance with user-specified load-balancing and/or failover policies.

13. The system of claim 11, wherein it is determined that the messaging system appropriately handled the errors selectively generated in response to the script when the messaging system ensures that at least a number of messages sent by the at least one publisher is received by the at least one subscriber, as intended.

14. The system of claim 11, wherein it is determined that the messaging system appropriately handled the errors selectively generated in response to the script when the messaging system ensures that an exact number of messages sent by the at least one publisher is received by the at least one subscriber, as intended.

15. A method of testing a messaging system comprising a broker cluster including a plurality of brokers configured to relay messages from at least one publisher to at least one subscriber over one or more cluster connections, the method comprising:
   enabling messages to be relayed from the at least one publisher to the at least one subscriber through the broker cluster in connection with a live, deployed broker system operating in accordance with a publish/subscribe model in a distributed network or cloud computing environment;
   providing a test driver configured to receive a script causing errors to be simulated in association with one or more components in the messaging system;
   providing a wide area network (WAN) simulator configured to simulate a network link and properties associated with the link, the properties including latency, jitter, bandwidth, and/or packet loss;
   causing the test driver to receive a script;
   in response to the test driver receiving the script, selectively generating errors in one or more components of the messaging system once it has been deployed and gone live, in connection with at least one processor coordinating between respective actions for the test driver and the simulator in accordance with the script; and
   determining, with the aid of the at least one processor, whether the messaging system properly handled the selectively generated errors in accordance with pre-defined load-balancing and/or failover policies, wherein errors that are simulatable in association with one or more components in the messaging system include a partial subset of brokers in the broker cluster going offline, the entire broker cluster going offline, a disconnect between some or all broker connections to the at least subscriber, a broker start/stop event, and the at least one subscriber going offline.

16. The method of claim 15, wherein each said subscriber includes a trigger subsystem configured to process incoming messages, at least some of the incoming messages being JMS messages.

17. The method of claim 15, further comprising reporting a success when a number of messages sent by the at least one publisher is equal to a number of messages received by each said subscriber, as intended, and otherwise reporting a failure.

18. The method of claim 15, further comprising reporting a success when a number of messages sent by the at least one publisher is greater than or equal to a number of messages received by each said subscriber, as intended, and otherwise reporting a failure.

19. A non-transitory computer readable storage media tangibly storing instructions that, when executed by at least one processor of a computer, perform testing of a messaging system comprising a broker cluster including a plurality of brokers configured to relay messages from at least one publisher to at least one subscriber over one or more cluster connections, the instructions being implemented to at least:
   enable messages to be relayed from the at least one publisher to the at least one subscriber through the broker cluster in connection with a live, deployed broker system operating in accordance with a publish/subscribe model in a distributed network or cloud computing environment;
   provide a test driver configured to receive a script causing errors to be simulated in association with one or more components in the messaging system;
   provide a wide area network (WAN) simulator configured to simulate a network link and properties associated with the link, the properties including latency, jitter, bandwidth, and/or packet loss;
   cause the test driver to receive a script;
   in response to the test driver receiving the script, selectively generate errors in one or more components of the messaging system once it has been deployed and gone live, in connection with at least one processor coordinating between respective actions for the test driver and the simulator in accordance with the script; and
   determine, with the aid of the at least one processor, whether the messaging system properly handled the selectively generated errors in accordance with pre-defined load-balancing and/or failover policies, wherein errors that are simulatable in association with one or more components in the messaging system include a partial subset of brokers in the broker cluster going offline, the entire broker cluster going offline, a disconnect between some or all broker connections to the at least subscriber, a broker start/stop event, and the at least one subscriber going offline.

20. The system of claim 1, wherein the processing resources are configured to coordinate with the test driver and the simulator to selectively generate errors in one or more components of the messaging system, while the messaging system is in a real production environment.

* * * * *